(12) United States Patent
Thakur (10) Patent No.: US 6,983,298 B2
(45) Date of Patent: Jan. 3, 2006

(54) METHOD AND APPARATUS FOR LINEAR INTERPOLATION USING GRADIENT TABLES

(75) Inventor: Vivek Kumar Thakur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 689 days.

(21) Appl. No.: 10/077,230

(22) Filed: Feb. 15, 2002

(65) Prior Publication Data

US 2002/0165890 A1 Nov. 7, 2002

Related U.S. Application Data (60) Provisional application No. 60/279,538, filed on Mar. 28, 2001.

(51) Int. Cl.
*G06F 7/38* (2006.01)
(52) U.S. Cl. .................................... 708/290
(58) Field of Classification Search ............... 708/290
See application file for complete search history.

(56) References Cited

U.S. PATENT DOCUMENTS

| | | | | |
|---|---|---|---|---|
| 4,282,578 A | * | 8/1981 | Payne et al. | 708/290 |
| 4,412,339 A | * | 10/1983 | Alfke et al. | 708/290 |
| 5,191,546 A | * | 3/1993 | Green | 708/290 |
| 6,219,464 B1 | * | 4/2001 | Greggain et al. | 708/290 |
| 6,256,653 B1 | * | 7/2001 | Juffa et al. | 708/290 |
| 6,426,749 B1 | * | 7/2002 | Knittel et al. | 345/426 |
| 6,704,758 B1 | * | 3/2004 | O'Donnell | 708/290 |

* cited by examiner

*Primary Examiner*—Kakali Chaki
*Assistant Examiner*—Chat C Do
(74) *Attorney, Agent, or Firm*—Robert D. Marshall, Jr.; W. James Brady, III; Frederick J. Telecky, Jr.

(57) ABSTRACT

This invention is a method and apparatus for interpolation which enables simpler and cost efficient implementation in hardware or software. A function table stores values of the function at addresses corresponding to the argument points where the function is known. The input value enables identification of the function values for arguments immediately below and above the input value. Respective bits of the absolute value of the difference between these two function values enables corresponding gradient value tables. A set of gradient values are stored in these gradient value tables. The least significant bits of the input value, those bits less significant than the arguments of the stored function values, address entries in the enabled gradient value tables. The desired interpolation value is the sum of the first function value and the gradient value recalled from the gradient tables.

6 Claims, 4 Drawing Sheets

METHOD AND APPARATUS FOR LINEAR INTERPOLATION USING GRADIENT TABLES

This application claims priority under 35 USC §119(e)(1) of Provisional Application No. 60/279,538, filed Mar. 28, 2001.

TECHNICAL FIELD OF THE INVENTION

The technical field of this invention is printer controllers rendering pages encoded in a page description language into printer scan control data.

BACKGROUND OF THE INVENTION

Raster image processing it the process of converting print data from a page description language to printer scan control data. Linear interpolation is often required in raster image processing, for example, in color conversion. In a raster image processing application, the amount of data to be interpolated for color conversion can be enormous. This interpolation will require significant amount of processing time. According to the prior art, dedicated hardware or a semiconductor application specific integrated circuit (ASIC) was used to speed up the execution performance of the application. Interpolation requires multiplication. Some the general purpose data processors do not support single cycle multiplication. Interpolation using one of these data processors can be very expensive in computation time.

The conventional linear interpolation method requires four addition/subtraction, one multiplication and one divide operations. The multiplication and divide operations are very expensive in terms of processing time. In case of s dedicated hardware implementation, the circuits required for multiplication and division are very numerous, require complex design and are slow in performance.

SUMMARY OF THE INVENTION

This invention is a method and apparatus for interpolation which enables simpler and cost efficient implementation in hardware or software. A function table stores values of the function at addresses corresponding to the argument points where the function is known. The input value enables identification of the function values for arguments immediately below and above the input value. Respective bits of the absolute value of the difference between these two function values enables corresponding gradient value tables. A set of gradient values are stored in these gradient value tables. The least significant bits of the input value, those bits less significant than the arguments of the stored function values, address entries in the enabled gradient value tables. The desired interpolation value is the sum of the first function value and the gradient value recalled from the gradient tables.

This technique has advantages over prior hardware and software techniques. It does not require extensive hardware to perform multiplication and division. The processing of this invention is addition, subtraction and shifting. The use of two levels of tables greatly reduces the amount of memory required for the desired level of precision.

BRIEF DESCRIPTION OF THE DRAWINGS

These and other aspects of this invention are illustrated in the drawings, in which.

DETAILED DESCRIPTION OF PREFERRED EMBODIMENTS

Let F(X) be the function to be interpolated. The values of the function F(X) are stored in a lookup table F for some sample values of input X. To compute the value for F(X) at X= X', we select two neighboring points X1 and X2 of X' such that the table F contains value of F(X1) and F(X2) and X1<X'<X2. The interpolation calculation is as follows:

$$F(X') = F(X1) + \frac{F(X2) - F(X1)}{X2 - X1} \times (X' - X1) \quad (1)$$

As shown in equation (1), conventional linear interpolation method requires four addition/subtraction operations, one multiplication operation and one divide operation. The multiplication and divide operations are expensive in terms of hardware or processing time. If implemented in hardware, multiplication and division circuits involves complex design and slow performance. If implemented in software, multiplication and division require long computing time.

This invention uses gradient tables to compute the interpolated value of the function F(X). This invention replaces the multiplication and divide operations using gradient tables and an addition operation. For simplicity of explanation, assume following:

1. The input variable X is represent by 16 bits. This could be an integer representation or a fixed-point representation.

2. The 8 most significant bits of input X are used for access into the lookup table F for values of function F(X). In software, these 8 most significant bits are derived from input X by a mask and shift operation: (X & 0xFF00)>>8. The quantity "0xFF00" is the hexadecimal representation of a 16 bit digital number having 1's as the 8 most significant bits and 0's as the 8 least significant bits. The logical AND of this mask with input X extracts the 8 most significant bits.

3. The 8 least significant bits of input X are used to index the gradient tables for interpolation. In software, these 8 least significant bits are derived from input X by a mask operation: (X & 0x00FF). The quantity "0x00FF" is the hexadecimal representation of a 16 bit digital number having 0's as the 8 most significant bits and 1's as the 8 least significant bits. The logical AND of this mask with input X extracts the 8 least significant bits.

This invention uses a function lookup table, plural gradient tables and few addition/subtraction operations for interpolation.

The function lookup table F contains the values for function F(X). The function lookup table F contains the values of F(X) at uniform intervals of input X. The uniform interval is preferably in steps of $2^N$, where N is an integer. However, interval sizes other than $2^N$ can be handled by appropriate change in data access method. In above example, the function lookup table F includes 256 entries representing 8 most significant bits of input X.

The gradient tables G contain the values of function y=m*x. The values in these tables are stored at desired resolution for interpolation. This is the resolution at which input X can be represented and up to the step size of function lookup table F. The value of m is chosen so that m*(function table step size) is 1, 2, 4, 8, 16 . . . $2^N$. The number of gradient tables required depends on the maximum change in the value of F(X) for the step size. This is the maximum number of bits required to represent F(X2)–F(X1). One gradient table G is provided for each bit.

If the value of function F(X) is not an integer function, then the same concept can be used to handle a suitably selected fixed-point representation of F(X).

Summarizing the assumptions of this example:
1. The input X is a 16-bit number.
2. The output F(X) is a 16-bit number.
3. The function table F stores 256 values of F(X) for X=n*$2^{256}$ for n from 0 to 255.
4. There are 8 gradient tables G, each having 256 entries designated G(i,Y), where i is 0 to 8 and Y is 0 to 256. G(0,Y) represents m=1/256; G(1,Y) represents m=2/256; G(2,Y) represents m=4/256; and finally G(7,Y) represents m=128/256.

Figure 1:
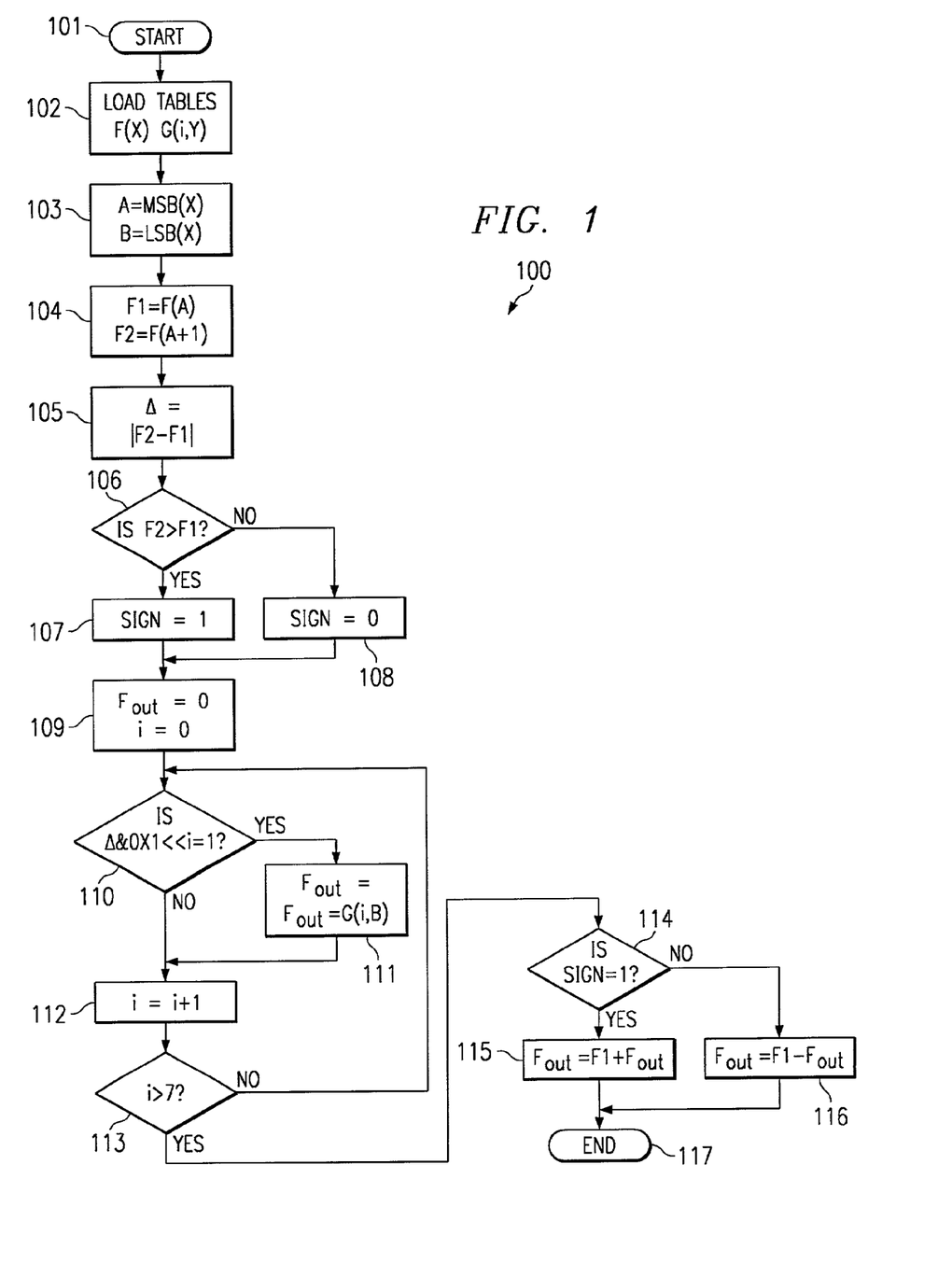
FIG. 1 is a flow chart of the method of a first embodiment of this invention.

FIG. 1 illustrates the algorithm in flow chart form. Process 100 begins at start block 101. The function and gradient tables are loaded at processing block 102. The input is divided into the function table part A and the gradient table part B at process block 103. As previously described the function table input A is the 8 most significant bits of the input X and the gradient table input B is the 8 least significant bits of the input X.

Process 100 next recalls data from function table F for the two points before and after the input X (process block 104). This function data is F(A) and F(A+1). Note that A is effectively the most significant bits of input X, with the least significant bits set to all 0's (processing block 103). Thus unless input X has its least significant bits set to all 0's, A is the next lower entry in the function table F. Note if input X has its least significant bits set to all 0's, then no interpolation is needed, the function value for this input is stored in the function table F.

A variable Δ is set to the absolute value of the difference of values F1 and F2 at processing block 105. This is the numerator term of the fraction of equation 1 above.

Process 100 next sets a variable Sign. Process 100 tests to determine if F2 is greater than F1 (decision block 106). If true (Yes at decision block 106), then Sign is set to 1 at processing block 107. If not true (No at decision block 106), then Sign is set to 0 at processing block 108. This variable Sign selects addition or subtraction at the end of the algorithm as shown below.

Processing block 109 initializes a loop variable i and a accumulator variable Fout. This begins a loop using the gradient tables. Decision block 110 tests to determine if a particular bit is 1. The logic expression "Δ& 0×1<<i" masks one bit of Δ set by the loop variable i. If this quantity is 1, indicating that the corresponding bit of Δis 1, then the new value of Fout is set to the prior value plus an entry from a gradient table (processing block 111). The gradient table entry is indexed by the loop variable i and the least significant bits B of the input X. The gradient table stores fractional values corresponding to the bit of the difference Δ and the least significant bits B of input X. If the mask quantity of decision block 110 is 0, then Fout is not changed. The loop sums these fractional parts for all bits of the difference Δ. The index variable i is incremented in processing block 112. Decision block 113 tests to determine if the index variable i is greater than 7. If not (No at decision block 113), then the loop repeats at decision block 110. This loop continues until the index variable i is greater than 7 (Yes at processing block 113).

There remains a final sum corresponding to the sum in equation 1. Decision block 114 tests to determine is Sign is 1. If so (Yes at decision block 114), then process 100 sets the output value Fout to the sum of Fl, the function value of the next lower stored value of F, and the value Fout formed by the loop (processing block 115). If not (No at decision block 114), then process 100 sets the output value Fout to the difference of F1 minus the value Fout formed by the loop (processing block 116). In either case, process 100 is complete (end block 117). To repeat the process for the same function but a different input value, re-enter process 100 at process block 102 because the function and gradient tables do not need to be reloaded. To repeat the process for a new function, re-enter at start block 101.

The following Listing 1 is an example high-level language pseudo code implementing this algorithm. This pseudo code must be adapted for the particular language and instruction set of the data processor used. This pseudo code embodies decision functions of the loops of blocks 106 to 108, blocks 110 and 111 and blocks 114 to 116 as single "If: Then, Else" statements. This pseudo code embodies the loop of processing blocks 110 to 113 as a "For . . . Do" statement. These are conventional programming techniques to embody these functions. This pseudo code uses slightly different variable names that those used in FIG. 1. This pseudo code assumes that the function table and gradient tables are already loaded. One skilled in the art would know how to properly load these tables based upon the selected language used to embody this invention. Note that a practical embodiment would probably test to determine if the least significant bits of input X are all 0's, to avoid the interpolation loop because the function table stores the value for this input.

1. fun_index =(X & 0xFF00)>>8;
2. gradient_index=X & 0x00FF;
3. F1=F[fun_index];
4. F2=F[fun_index+1];
5. Δ=_F2–F1_;
6. If F2>F1
   Then Sign=1
   Else Sign 0;
7. Fount=0;
8. For index=0 to 7 Do
   If (Δ & (0x1<<index))
     Then Fout=Fout+G[index,gradient_index];
9. If (Sign)
   Then Fout=F1+Fout
   Else Fout=F1–Fout;

Listing 1

Note that this structure is advantageous over a direct lookup table. First, the smaller F and G tables will be faster to access than one large function table. Second, the amount of memory required is less. A straight lookup table requires $2^{16}$ or 65,536 entries. Assuming each entry is 2 bytes (16 bits), this translates into 131K bytes of memory. In this embodiment of the invention, the F table includes 256 entries of 16 bits each and each of 8 G tables also includes 256 entries of 16 bits each. The total amount of memory required in this embodiment of this invention is thus 4608 bytes. Thus this invention requires less than 4% of the memory of a direct lookup table implementation. The amount of memory needed for this invention may easily fit within a data processor on-chip cache while the direct lookup table implementation is unlikely to fit the whole table in on-chip cache.

Figure 2:
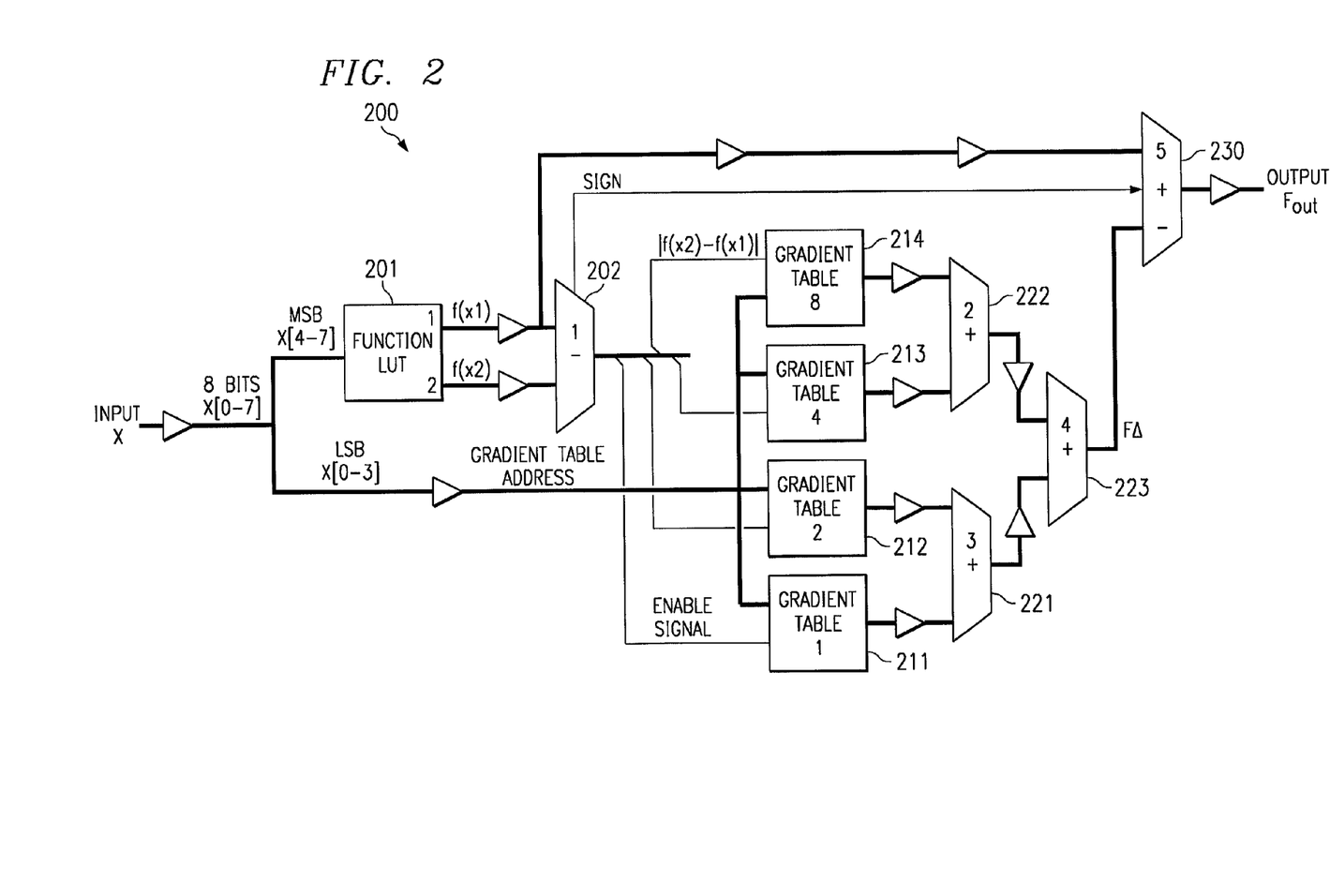
FIG. 2 illustrates circuitry for practicing the first embodiment of this invention in hardware.

FIG. 2 illustrates circuitry 200 for implementing this first embodiment of the invention. This hardware implementation example uses the following assumptions, which differ from the assumptions of the above-described software embodiment:

1. The input variable X is represent by 8 bits. This could be an integer representation or a fixed-point representation.

2. The 4 most significant bits of input X are used for access into the lookup table for values of function F(X). Thus the function table F contains values of F(X) for X & 0xF0.

3. The 4 least significant bits are used for interpolation.

4. The difference F(X2)−F(X1) is no more than 4 bits for any two neighboring points FIG. 2 illustrates hardware circuit 200 of this example. The 4 most significant bits of the input X serves as and index address into lookup table 201. Lookup table 201 stores the function F(X) in a memory block having 16 entries. Lookup table 201 has two output ports. The output port 1 of lookup table 201 supplies F(X1), the data corresponding to the four most significant bits of the input X. The output port 2 supplies F(X2), the data at the next function entry in the table.

The output from both output ports is supplied to subtractor 202. Subtractor 202 is hardwired to form the absolute value of the difference between F(X2) minus F(X1). This quantity is used the index the gradient tables 211, 212, 213 and 214. Subtractor 202 is also hardwired to form a sign signal corresponding to this difference. The sign signal is 1 when F(X2)−F(X1) is positive and 0 when F(X2)−F(X1) is negative. The sign signal is supplied to adder 230 and controls its operation in a manner that will be described below.

Circuit 200 includes multiple gradient tables 211, 212, 213 and 214 for respective bits 1, 2, 4 and 8. The gradient tables 211, 212, 213 and 214 are memory blocks of 16 entries. Gradient table 211 contains values 0/16, 1/16, 2/16, 3/16, etc. In general, each gradient table contains values 0, m/16, 2m/16, 3m/16, etc, where m is the corresponding bit number. Each gradient table 211, 212, 213 and 214 has an input address port receiving the 4 least significant bits of input X. These 4 least significant bits are used to access a gradient table entry. Each gradient table 211, 212, 213 and 214 also receives an enable signal. The enable signal is a corresponding bit of the difference produced by subtractor 202. The gradient table is enabled when this bit is 1, and not enabled when this bit is 0. Each gradient table 211, 212, 213 and 214 outputs the data in the entry specified by the 4 least significant bits of input X through an output port only when enabled. When a gradient table is not enabled, its output is 0. These gradient tables store delta values corresponding to the bit and the 4 least significant bits of the input X.

Adders 221, 222 and 223 performed unsigned addition. Adder 221 adds the outputs of gradient tables 211 and 212. Adder 222 adds the outputs of gradient tables 213 and 214. Adder 223 forms the sum of the outputs of adders 221 and 222. This sum output of adder 223, designated FA, is the equivalent of the intermediate quantity Fout described above in reference to FIG. 1 and Listing 1. Note that circuit 200 forms this quantity in parallel hardware, accessing gradient tables 211, 212, 213 and 214 simultaneously, rather than the sequential access of FIG. 1 and Listing 1. Adder 5 forms the output of circuit 200, the interpolated value Fout. Adder 5 adds F(X1) and FΔ if the Sign signal is 1, otherwise adder 5 subtracts FΔ from F(X1).

The above described embodiments have a limitation. These embodiments can not support interpolation of those functions where F(X2)−F(X1)≧16 for any two consecutive points in lookup table 201. However this problem can be overcome adding more gradient tables. In general, if the function F(X) is represented in 16 bits, then this embodiment requires 16 gradient tables. Thus one gradient table is required for every bit of the function result.

The above described embodiments may require very large memories for some cases. This is especially true where higher number of bits are required to represent the difference F(X2)−F(X1). A second embodiment of this invention provides a trade-off between computation speed and the amount of memory required. This second embodiment uses a similar function table and similar gradient tables. This second embodiment trades off the number of gradient tables required off for a number of iterations required for computation. This second embodiment uses only 4 gradient tables and the 4 most significant bits of the delta are computed through iteration.

This description employs the following assumptions:

1. The input X is a 16-bit number.
2. The output F(X) is a 16-bit number.
3. The function table F stores 256 values of F(X) for $X=n*2^{256}$ for n from 0 to 255.
4. There are 4 gradient tables G, each having 256 entries designated G(i,Y), where i is 0 to 4 and Y is 0 to 256. G(0,Y) represents m=1/256; G(1,Y) represents m 2/256; G(2,Y) represents m=4/256; and finally G(4,Y) represents m=8/256.

Figure 3:
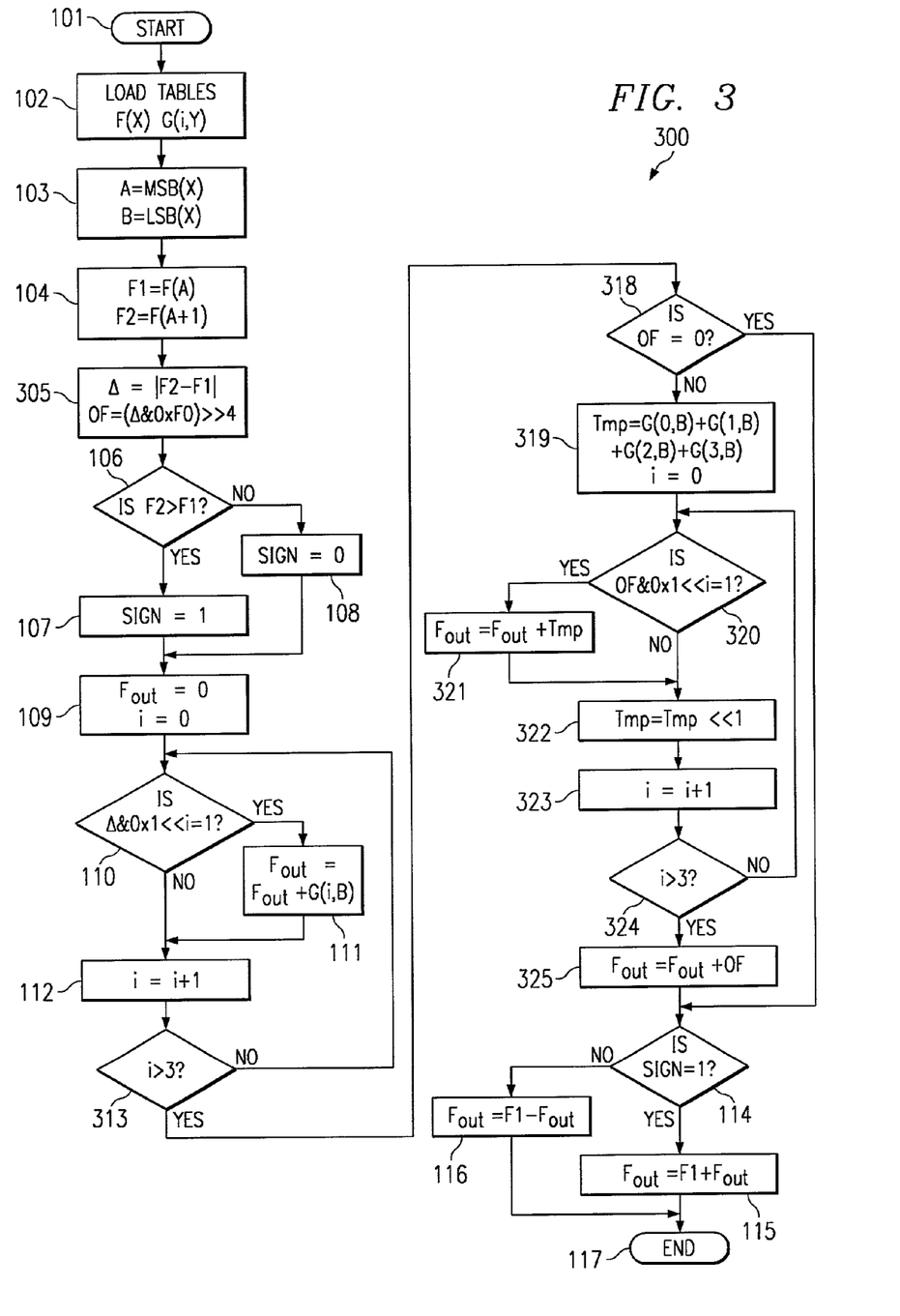
FIG. 3 is a flow chart of the method of a second embodiment of this invention.

FIG. 3 illustrates the algorithm in flow chart form. Process 300 is very similar to process 100 of FIG. 1. The same reference numbers are used in FIG. 3 when illustrating blocks that are the same as illustrated in FIG. 1. Process 300 begins at start block 101. The function and gradient tables are loaded at processing block 102. The input is divided into the function table part A and the gradient table part B at process block 103.

Process 300 next recalls data from function table F for the two points before and after the input X (process block 104). This function data is F(A) and F(A+1).

A variable Δ is set to the absolute value of the difference of values F1 and F2 at processing block 305. This is the numerator term of the fraction of equation 1 above. Processing block 305 also sets an overflow variable OF equal to the 4 most significant bits of Δ. This overflow variable OF is used later in a manner that will be described below.

Process 300 next sets a variable Sign. Process 300 tests to determine if F2 is greater than F1 (decision block 106). If true (Yes at decision block 106), then Sign is set to 1 at processing block 107. If not true (No at decision block 106), then Sign is set to 0 at processing block 108.

Processing block 109 initializes a loop variable i and a accumulator variable Fout. This begins a loop using the gradient tables. Decision block 110 tests to determine if a particular bit is 1. The logic expression "Δ & 0x1<<i" masks on bit of Δ set by the loop variable i. If this quantity is 1, indicating that the corresponding bit of Δ is 1, then the new value of Fout is set to the prior value plus an entry from a gradient table (processing block 111). The gradient table entry is indexed by the loop variable i and the least significant bits B of the input X. The gradient table stores fractional values corresponding to the bit of the difference Δ and the least significant bits B of input X. If the mask quantity of decision block 110 is 0, then Fout is not changed. The loop sums these fractional parts for all bits of the difference Δ. The index variable i is incremented in processing block 112. Decision block 313 tests to determine if the index variable i is greater than 3. If not (No at decision block 313), then the loop repeats at decision block 110. This loop continues until the index variable i is greater than 3 (Yes at processing block 313).

Note that this loop differs from the similar loop of process 100 illustrated in FIG. 1. Process 100 includes 8 gradient tables accessed in 8 iterations. Process 300 includes 4 gradient tables accessed in 4 iterations. Process 300 thus requires half the gradient table memory space than process 100. Process 300 employs an additional overflow loop to process interpolation delta values for the 4 most significant bits of Δ calculated in processing block 105. Processing block 305 sets the overflow variable OF as the four most significant bits of Δ. This additional processing is described below.

Process 300 tests to determine if the overflow variable OF is zero (decision block 318). If this is true (Yes at decision block 318), then the extra processing block is not needed. The loop including blocks 110, 111, 112 and 313 had already calculated the interpolation delta. Process 300 thus branches to processing block 114 for the final calculations. If this is not true (No at decision block 318), then the additional calculation loop is needed. This includes setting a temporary variable Tmp equal to the sum of the four gradient table values indexed by the 8 least significant bits of the input X at processing block 319. This temporary variable Tmp serves to enable calculation of the interpolation delta values for bits of higher order than included in the four gradient tables. Processing block 319 also initializes the loop index variable i at zero.

Process 300 next tests to determine if a particular bit of the overflow variable OF is 1 (decision block 320). The logic expression "OF & 0x1 <<i" masks one bit of OF set by the loop variable i. If this quantity is 1· (Yes at decision block 320), indicating that the corresponding bit of OF is 1, then processing block 321 adds the temporary variable Tmp to the accumulator variable Fout. If this quantity is 0 (No at decision block 320), then the accumulator variable Fout is unchanged.

Processing block 322 left shifts the temporary variable Tmp one bit. This provides an interpolation delta value for the next more significant bit of the overflow variable OF. Processing block 323 increments the loop variable I. Decision block 324 tests to determine if the index variable I is greater than 3. If not (No at decision block 324), then the loop repeats at decision block 320. This loop continues until the index variable I is greater than 3 (Yes at processing block 324). Processing block 325 completes the overflow loop by adding the overflow variable OF to the accumulator variable Fout.

There remains a final sum corresponding to the sum in equation 1. Decision block 114 tests to determine is Sign is 1. If so (Yes at decision block 114), then process 300 sets the output value Fout to the sum of F1, the function value of the next lower stored value of F, and the value Fout formed by the loop (processing block 115). If not (No at decision block 114), then then process 300 sets the output value Fout to the difference of F1 minus the value Fout formed by the loop (processing block 116). In either case, process 300 is complete (end block 117).

The following Listing 2 is an example high-level language pseudo code implementing this algorithm. This pseudo code must be adapted for the particular language and instruction set of the data processor used. This pseudo code embodies decision functions of the loops of blocks 106 to 108, blocks 110 and 111 and blocks 114 to 116 as single "If: Then, Else" statements. This pseudo code embodies the loop of processing blocks 110 to 113 as a "For . . . Do" statement. This pseudo code embodies the overflow loop of blocks 318 to 325 as a compound "If: Then, Else" statement. These are conventional programming techniques to embody these functions. This pseudo code uses slightly different variable names that those used in FIG. 3. In addition, some functions may be performed in different order. This pseudo code assumes that the function table and gradient tables are already loaded. One skilled in the art would know how to properly load these tables based upon the selected language used to embody this invention.

1. fun_index=(X & 0xFF00)>>8;
2. gradient_index=X & 0x00FF;
3. F1 =F[fun_index];
4. F2 =F[fun_index−1];
5. Δ=_F2−F1_;
6. Fount=0
7. overflow=Δ>>4
8. If F2>F1
   Then sign=1
   Else sign 0;
9. For index=0 to 3 Do
   If (Δ & (0x1<<index))
      Then Fout=Fout +G[index,gradient_index];
10. If (overflow)
    Tmp=G[0,gradient _index]+G[1,gradient_index]
       +G[2,gradient _index]+G[3,gradient index]
    For index =0 to 3 Do
       If (overflow & (0x1<<index))
          Then Fout=Fout+Tmp
       Tmp=Tmp <<1
    Fout=Fout+overflow;
11. If (sign)
    Then Fout=F1+Fout
    Else Fout=F1−Fout Listing 2

Figure 4:
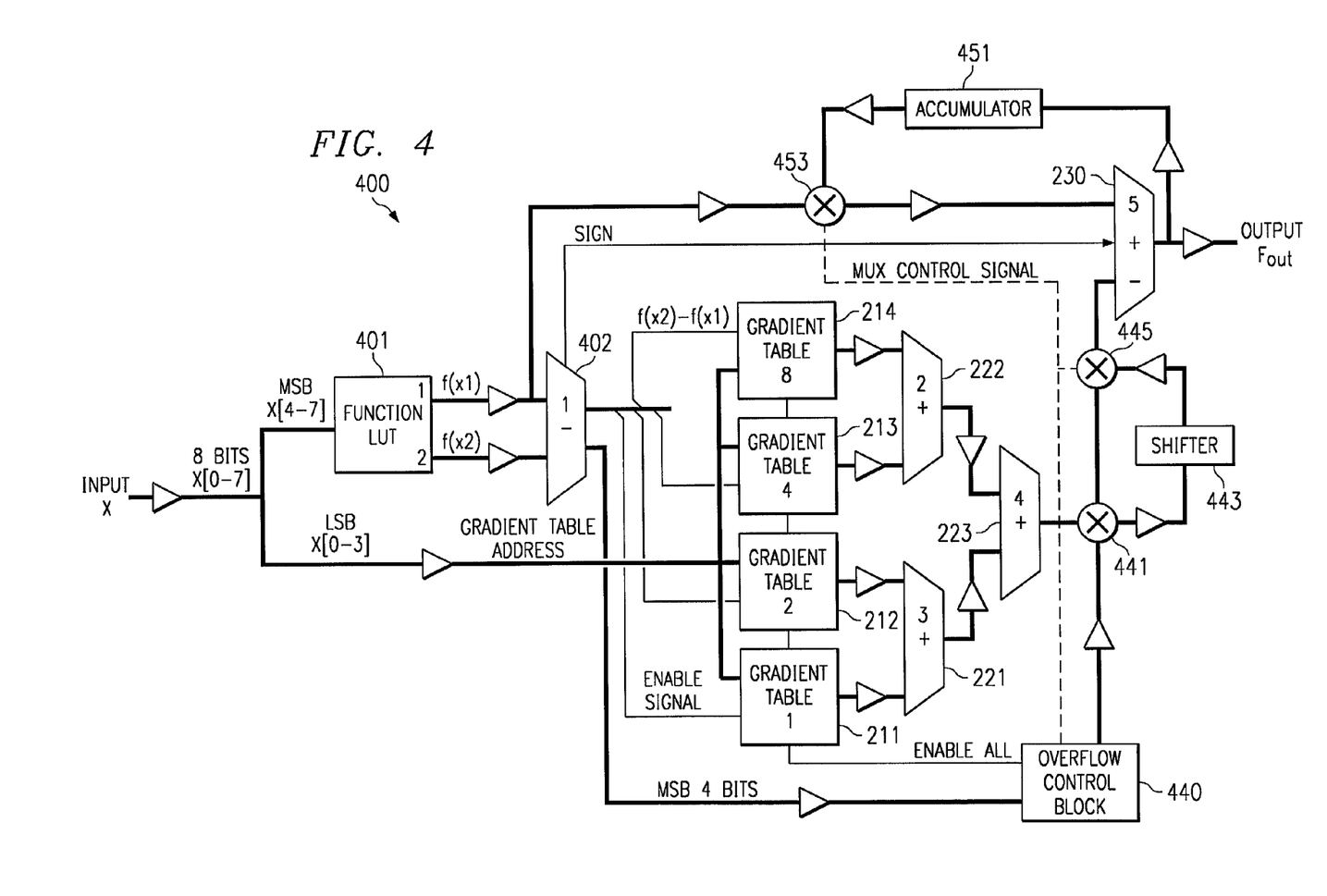
FIG. 4 illustrates circuitry for practicing the second embodiment of this invention in hardware.

FIG. 4 illustrates hardware circuit 400 embodying the second embodiment of this invention. This hardware implementation example uses the following assumptions, which differ from the assumptions of the above-described software embodiment of FIG. 3:

1. The input variable X is represent by 8 bits. This could be an integer representation or a fixed-point representation.
2. The 4 most significant bits of input X are used for access into the lookup table for values of function F(X).
3. The 4 least significant bits are used for interpolation.
4. The difference F(X2)−F(X1) may be up to 8 bits for any two neighboring points Circuit 400 of FIG. 4 is similar to circuit 200 of FIG. 2. Like parts have been given the same reference numbers. The following description will focus on the differences between circuit 400 and circuit 200. For a better understanding of the basic operation of circuit 400, please refer to the description of circuit 200 in conjunction with FIG. 2.

Function lookup table 401 is addressed by the 4 most significant bits of input X. Function lookup table 401 thus has 16 entries. In contrast to function lookup table 201, the difference between adjacent entries in function lookup table 401 may be a magnitude up to an 8-bit number. Thus subtractor 402, which forms the absolute value of the difference between F(X1) and F(X2) and the Sign of this difference, may output 8 bits. The 4 least significant bits of this absolute value are supplied as enable signals to the respective gradient tables 211, 212, 213 and 214 as in circuit 200. The 4 most significant bits of this absolute value are supplied to overflow control block 440. The operation of overflow control block 440 is described below.

Adders 221, 222 and 223 add the outputs of the gradient tables 211, 212, 213 and 214. If the 4 most significant bits of the absolute value output by subtractor 402 are all 0, then overflow control block 440 controls multiplexers 441, 445 and 453 so that adder 230 adds F(X1) and the interpolation delta from adder 223 or subtracts the interpolation delta from adder 223 depending on the Sign signal, thereby forming the interpolated output Fout. This yields the same result as produced by circuit 200. Note that the output of adder 230 is also stored in accumulator 451.

Overflow control block 440 controls an overflow iteration process if the 4 most significant bits of the absolute value output by subtractor 402 are not all 0. This overflow iteration occurs after the initial interpolation delta calculation described above. Note that this initial interpolation delta is added to or subtracted from F(X1) and this result is stored in accumulator 451. If the overflow is non-zero, then overflow control block 440 supplies the 4 most significant bits of the absolute value from subtractor 402 to multiplexer 441. Overflow control block 440 controls multiplexers 441, 443 and 435 to cause adder 230 to add this overflow from the absolute value to the contents of accumulator 451. The result is again stored in accumulator 451. Next, overflow control block 440 enables all the gradient tables 211, 212, 213 and 214. These gradient tables 211, 212, 213 and 214 are addressed by the 4 least significant bit of input X. Adders 221, 222 and 223 add the gradient table outputs. Overflow control block 440 controls multiplexer 441 to store the sum output of adder 223 in shifter 443. Overflow control block 440 controls shifter 441 to left shift its contents by one bit. This process produces an interpolation value for the first overflow bit, that is the fifth bit of the absolute value produced by subtractor 402. Overflow control block 440 checks this first bit in the overflow. If this bit is 1, then overflow control block 440 controls multiplexer 445 to supply the contents of shifter 443 to one input of adder 230 and controls multiplexer 453 to supply the contents of accumulator 451 to the other input of adder 230. Adder 230 adds these inputs if Sign is 1 and subtracts the contents of shifter 443 from the contents of accumulator 451 is Sign is 0. The result is stored in accumulator 451.

This overflow process repeats for each bit of the overflow of the absolute value from subtractor 402. Shifter 443 produces the interpolation value for the next more significant bit. This is supplied to adder 230 for addition or subtraction depending on the Sign bit if the corresponding overflow bit is 1. If the corresponding overflow bit is 0, then overflow control block 440 does not change the contents of accumulator 451. The desired output value is the result of the final sum/difference from adder 230.

The hardware embodiments of this invention can be used to develop low cost, fast and programmable hardware in the form of an application specific integrated circuit (ASIC) for interpolation. This interpolation hardware can be constructed as a part of a general purpose ASIC for the particular application or as a controllable part of programmable processor. Alternatively, the invention can be used as a method to program a general purpose processor which doesn't have a fast multiply function to perform the interpolation. Applications where interpolation takes significant processing time can be speeded up using interpolation hardware include raster image processing, the conversion of print data from a page description language to printer control signals.

What is claimed is:

1. A method of forming an interpolation value of a function for input values between argument values for which the function value is known, comprising the steps of:
storing in a memory function values corresponding to discrete values of an argument of the function for which the function value is known;
receiving an input value;
determining a first argument value for which the function value is known immediately less than the input value;
forming a least significant bit difference between the input value and the first argument value having a predetermined number of less significant bits, each such bit less significant than a least significant bit of the first argument value;
determining a second argument value for which the function value is known immediately greater than the input value;
recalling from the memory a first function value for the first argument value;
recalling from the memory a second function value for the second argument value;
forming an absolute value of a difference between the second function value minus the first function value;
determining a sign of the difference between the second function value minus the first function value;
storing in a memory a set of gradient values for each bit of the absolute value of the difference and each of the predetermined number of less significant bits;
recalling from the memory gradient values for the least significant bit difference corresponding to bits where the absolute value of the difference is 1;
summing the recalled gradient values;
if the sign of the difference is 1, adding the sum of the recalled gradient values to the first function value; and
if the sign of the difference is 0, subtracting the sum of the recalled gradient values from the first function value.

2. The method of claim 1, wherein:
each of the function values consists of 16 bits;
the discrete values of an argument of the function for which the function value is known consists of 16 bit numbers whose 8 least significant bits are "00000000";
the step of storing function values consists of storing 256 function values of 16 bits each;
the step of storing a set of gradient values consisting of storing 8 gradient tables consisting of 256 gradient values of 16 bits each;
said predetermined number of less significant bits is no more than 8 bits;
said input consists of 16 bits, 8 most significant bits of the input accesses a particular stored function value and 8 least significant bits of the input accesses a particular stored gradient value in each gradient table.

3. The method of claim 1, wherein:
the step of storing a set of gradient values stores one set of gradient values for a second predetermined number of bits less than the predetermined number of less significant bits;
the step of recalling gradient values for the least significant bit difference corresponding to bits where the absolute value of the difference is 1 includes
for the second predetermined number bits recalling a gradient value from a set of gradient values corresponding to a particular one of the second predetermined number of bits, the gradient value being an entry corresponding to the least significant bit difference, for a first bit next more significant that a most significant one of the second predetermined number of bits recalling a gradient value from each set of gradient values, each gradient value being an entry corresponding to the least significant bit difference, and summing all such gradient values, for each bit next more significant than a prior bit, multiplying the summed gradient values by two;

the step of summing the recalled gradient values includes iteratively summing recalled gradient values for the second predetermined number of bits forming a first gradient value sum, iteratively summing the recalled gradient values for bits more significant than the second predetermined number of bits forming a second gradient sum, and summing the first gradient sum, the second gradient sum and the bits of the absolute value of the difference more significant than the second predetermined number of bits.

4. An apparatus for interpolation comprising:

an input for receiving an input value;

a function value lookup table memory connected to the input storing function values corresponding to discrete values of an argument of the function for which the function value is known, the function value lookup table memory addressed by a first predetermined number of most significant bits of said input value to recall a first function value corresponding to said first predetermined number of most significant bits of the input value and a second function value corresponding to a next greater argument;

a subtractor connected to said function value lookup table, said subtractor forming an absolute value of a difference of the second function value minus the first function value and an indication of the sign of the difference of the second function value minus the first function value;

a set of gradient value lookup table memories, one for each bit of a second predetermined number of least significant bits of said absolute value of said difference, each gradient value lookup table memory having an enable input connected to a corresponding one of said second predetermined number of least significant bits of said absolute value of said difference and addressed by second predetermined number of least significant bits of said input value and storing a gradient value for each the predetermined number of less significant bits;

a set of first adders connected to said set of gradient value lookup table memories, said set of first adders adding the gradient values of enabled ones of the gradient value lookup table memories; and a second adder connected to said function value lookup table memory, said subtractor and said set of first adders, said second adder if the sign of the difference is positive, adding the sum of the recalled gradient values to the first function value, and if the sign of the difference is negative, subtracting the sum of the recalled gradient values from the first function value.

5. The apparatus of claim 4, wherein:

said input consists of 8 bits;

said function value lookup table memory consists of 16 entries of 8 bits each;

said difference between any two adjacent entries of said function value lookup table memory consists of no more than 4 bits;

said set of gradient value lookup table memories consists of 4 gradient value lookup table memories, each consisting of 16 entries of 8 bits each;

said set of first adders consists of a first gradient value adder having a first input connected to an output of a first gradient value lookup table memory, a second input connected to an output of a second gradient value lookup table memory and an output, a second gradient value adder having a first input connected to an output of a third gradient value lookup table memory, a second input connected to an output of a fourth gradient value lookup table memory and an output, and a third gradient value adder having a first input connected to said output of said first gradient value adder, a second input connected to said output of said second gradient value adder, and an output connected to an input of said second adder.

6. The apparatus of claim 4, wherein:

said input consists of 8 bits;

said function value lookup table memory consists of 16 entries of 8 bits each;

said difference between any two adjacent entries of said function value lookup table memory may be more than 4 bits;

said set of gradient value lookup table memories consists of 4 gradient value lookup table memories, each consisting of 16 entries of 8 bits each, each gradient table is enabled by a corresponding one of 4 least significant bits of said absolute value of said difference of the second function value minus the first function value;

said set of first adders consists of a first gradient value adder having a first input connected to an output of a first gradient value lookup table memory, a second input connected to an output of a second gradient value lookup table memory and an output, a second gradient value adder having a first input connected to an output of a third gradient value lookup table memory, a second input connected to an output of a fourth gradient value lookup table memory and an output, and a third gradient value adder having a first input connected to said output of said first gradient value adder, a second input connected to said output of said second gradient value adder, and an output connected to an input of said second adder;

said apparatus further comprising:

an overflow control block connected to said subtractor for receiving 4 most significant bits of said absolute value of said difference of the second function value minus the first function value, to said enable inputs of said set of gradient value lookup table memories and a overflow data output;

an accumulator having an input connected to said output of said second adder for storing said output of said second adder and an output;

a first multiplexer having a first input connected to receive said first function value recalled from said function value lookup table memory, a second input connected to said output of said accumulator and an output connected to a first input of said second adder, said first multiplexer selectively coupling said first function value or said accumulator output to said output;

a second multiplexer having a first input connected to said output of said third gradient value adder, a second input connected to said overflow data output of said overflow control block, a first output and a second output, said second multiplexer selectively connecting either said output of said third gradient value adder to said first, said output of said third gradient value adder to said second output, said overflow data said first output or said overflow data to said second output;

a shifter having an input connected to said first output of said second multiplexer and an output, said shifter operable to store a value and left shift said stored value one bit;

a third multiplexer having a first input connected to said second output of said second multiplexer, a second input connected to said output of said shifter and an output connected to a second input of said second adder, said third multiplexer selectively coupling said second output of said second multiplexer or said output of said shifter to said output;

wherein said overflow control block controls said first, second and third multiplexers and said shifter as follows:

controlling said first multiplexer to couple said first function value to said output, controlling said second multiplexer to couple said output of said third gradient value adder to said second output and controlling said third multiplexer to couple said second output of said second multiplexer to said output, if said 4 most significant bits of said absolute value of said difference of the second function value minus the first function value are non-zero, controlling said first multiplexer to couple said output of said accumulator to said output, controlling said second multiplexer to couple said overflow data to said second output and controlling said third multiplexer to couple said second output of said second multiplexer to said output, enabling all of said gradient value lookup table memories and controlling said second multiplexer to couple said output of said third gradient value multiplexer to said first output, and iteratively for each bit of said 4 most significant bits of said absolute value of said difference of the second function value minus the first function value from least significant bit to most significant bit controlling said shifter to left shift said stored value one bit, and if and only if a corresponding bit of said 4 most significant bits of said absolute value of said difference of the second function value minus the first function value is 1, controlling said first multiplexer to couple said output of said accumulator to said output, controlling said third multiplexer to couple said output of said shifter to said output.

* * * * *